US 6,672,450 B2

(12) United States Patent  (10) Patent No.: US 6,672,450 B2
Horne                      (45) Date of Patent:     Jan. 6, 2004

(54) IDLER SYSTEM FOR CONVEYOR

(75) Inventor: Robert A. Horne, Coeurd'Alene, ID (US)

(73) Assignee: Northwest Product Design, LLC, Coeur d'Alene, ID (US)

( * ) Notice: Subject to any disclaimer, the term of this patent is extended or adjusted under 35 U.S.C. 154(b) by 0 days.

(21) Appl. No.: 10/102,199

(22) Filed: Mar. 18, 2002

(65) Prior Publication Data

US 2002/0153231 A1 Oct. 24, 2002

Related U.S. Application Data

(60) Provisional application No. 60/285,628, filed on Apr. 23, 2001.

(51) Int. Cl.[7] .................. B65G 13/06; B65G 13/02; B65G 13/12; B65G 43/00
(52) U.S. Cl. .............. 198/836.3; 198/781.01; 198/782; 198/810.01; 198/810.04
(58) Field of Search .................. 198/780, 782, 198/824, 825, 829, 836.3, 781.01, 810.01, 810.02, 810.03, 810.04; 193/35 R, 37

(56) References Cited

U.S. PATENT DOCUMENTS

| 3,362,523 | A | * | 1/1968 | Stone | 198/826 |
| 5,107,982 | A | * | 4/1992 | Walter | 198/781.04 |
| 5,657,854 | A | * | 8/1997 | Chen et al. | 198/787 |
| 5,875,878 | A | * | 3/1999 | Pierson | 193/37 |
| 6,273,241 | B1 | * | 8/2001 | Bonnet | 198/790 |
| 6,302,255 | B1 | * | 10/2001 | Hollander | 193/35 R |
| 6,336,542 | B1 | * | 1/2002 | Mintonye, II | 193/37 |

* cited by examiner

Primary Examiner—Gene O. Crawford
(74) Attorney, Agent, or Firm—Wells St. John P.S.

(57) ABSTRACT

An idler system for conveyors, the system providing an idler which is released or propelled downwardly away from the conveyor belt, when a pre-determined condition is present, such as the tripping of an idler guard or the presence of a pre-determined amount of pressure on the idler. The idler itself may be releasably attached to a conveyor framework, or it may be provided with an idler bracket which is partially or wholly released with the idler.

26 Claims, 9 Drawing Sheets

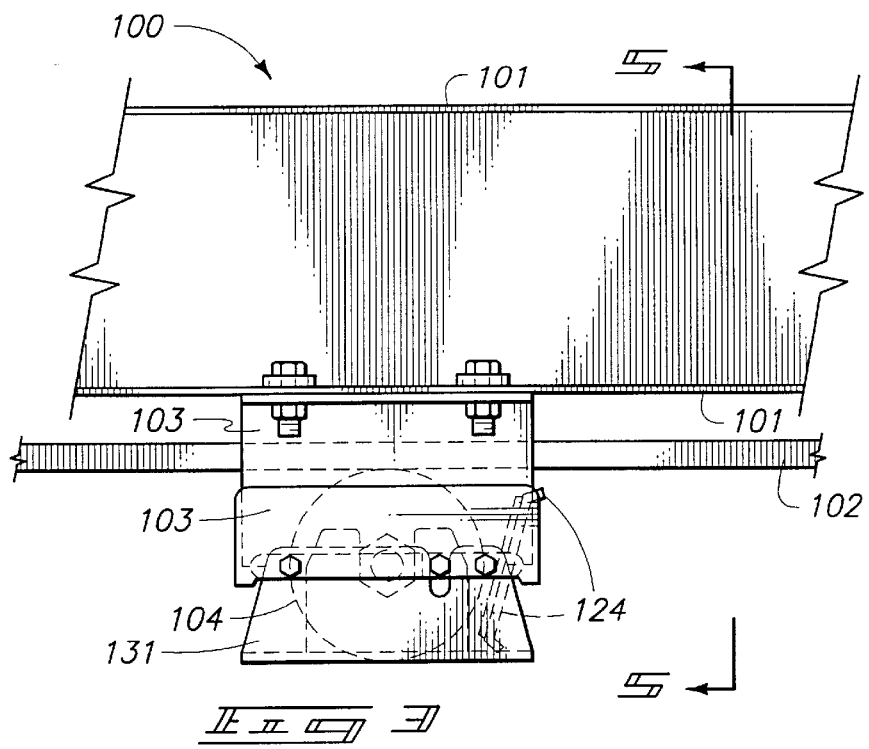
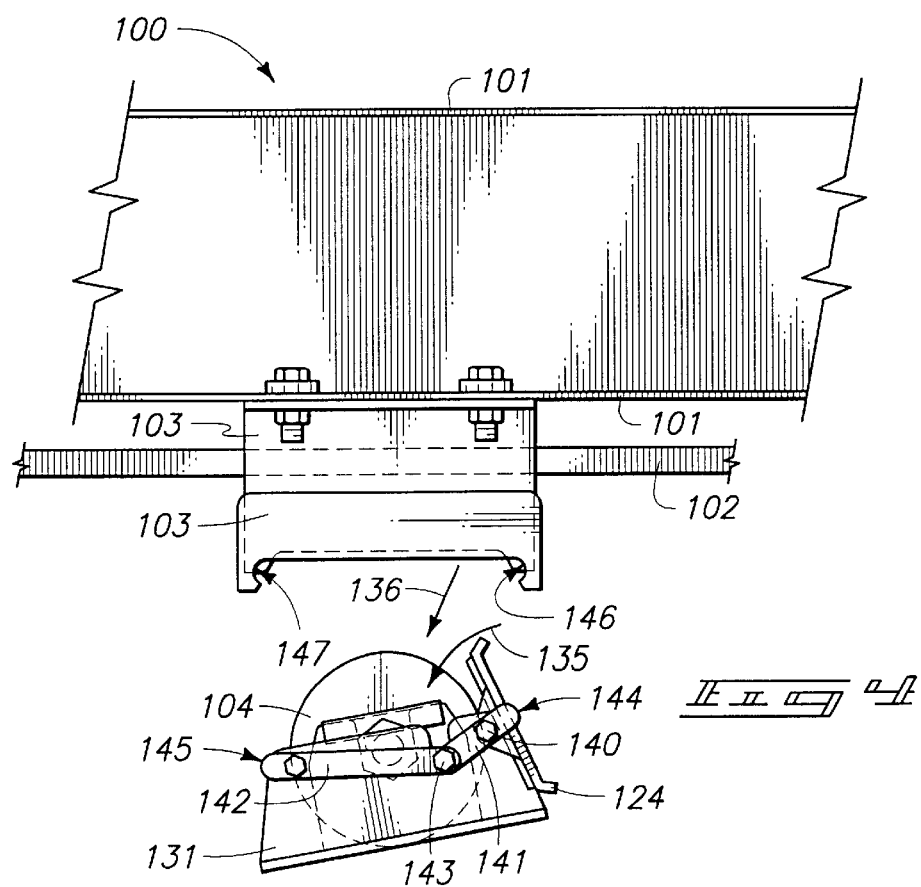

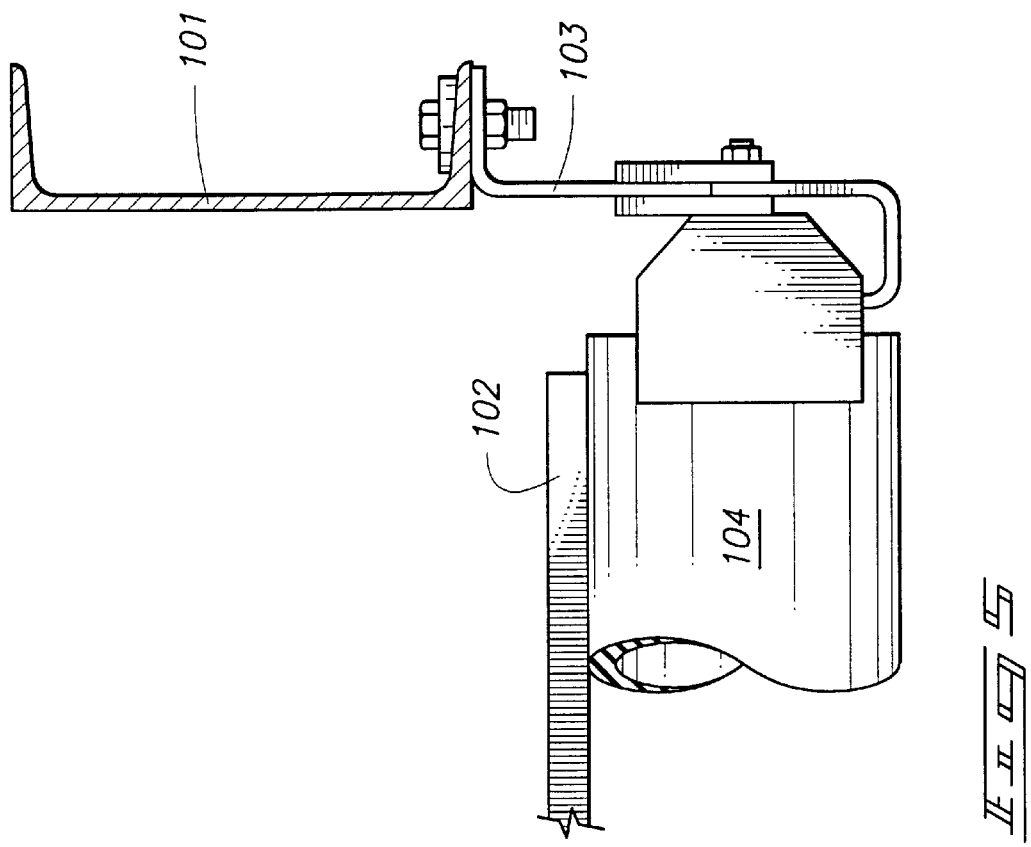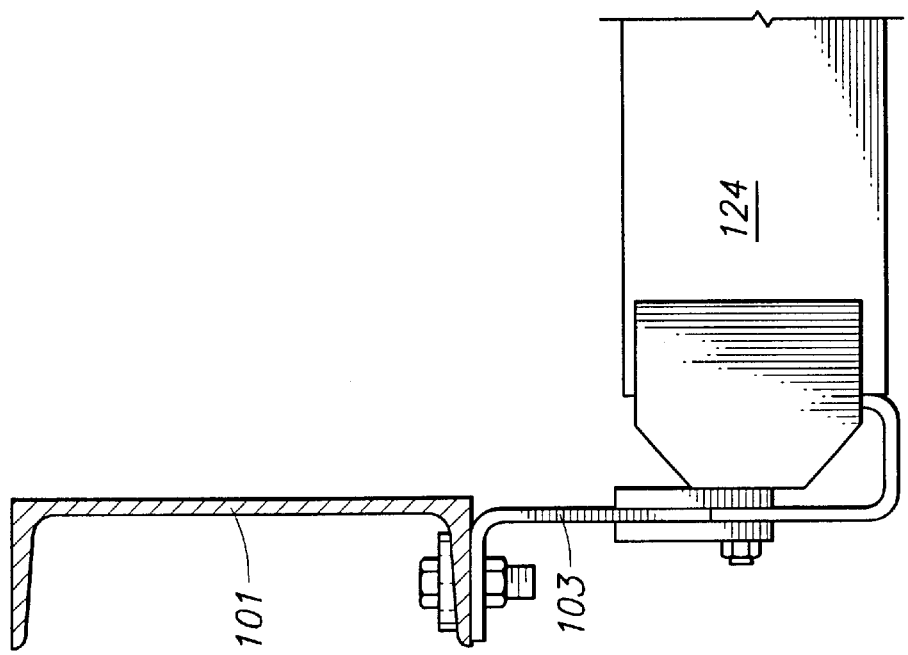

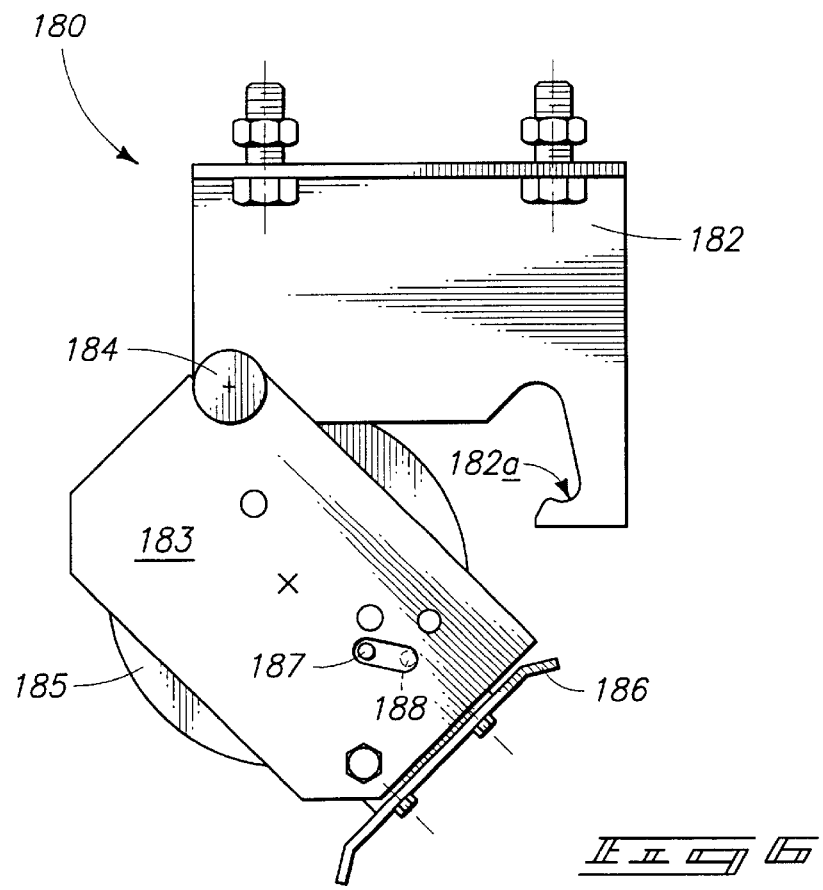
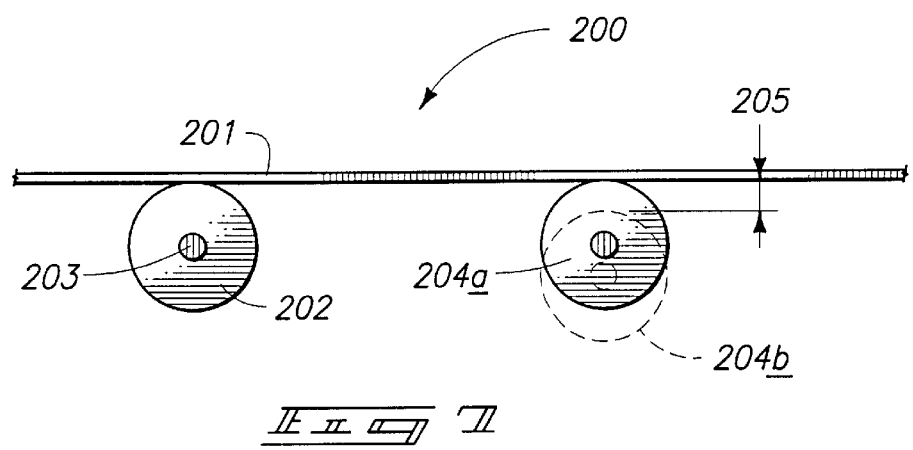

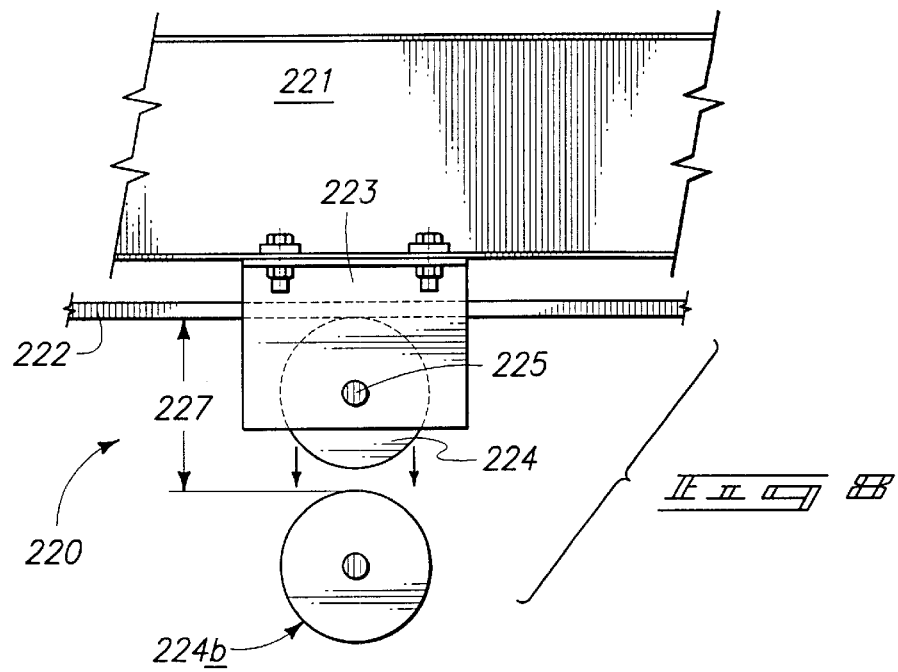
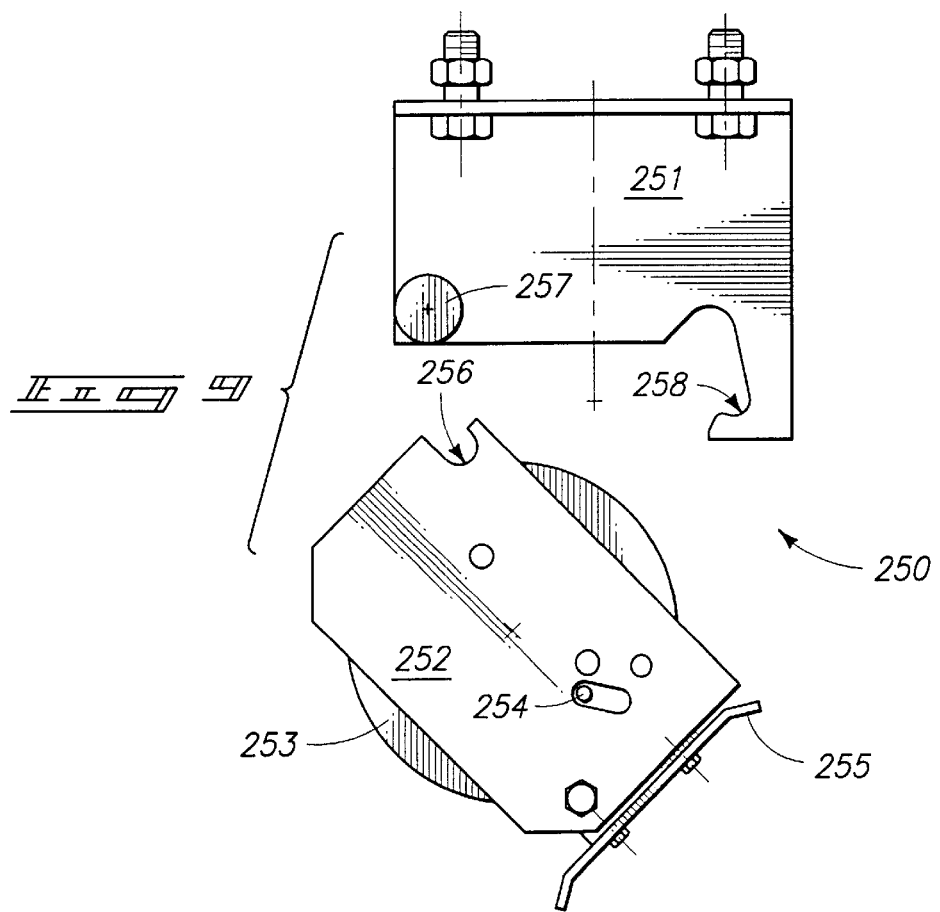

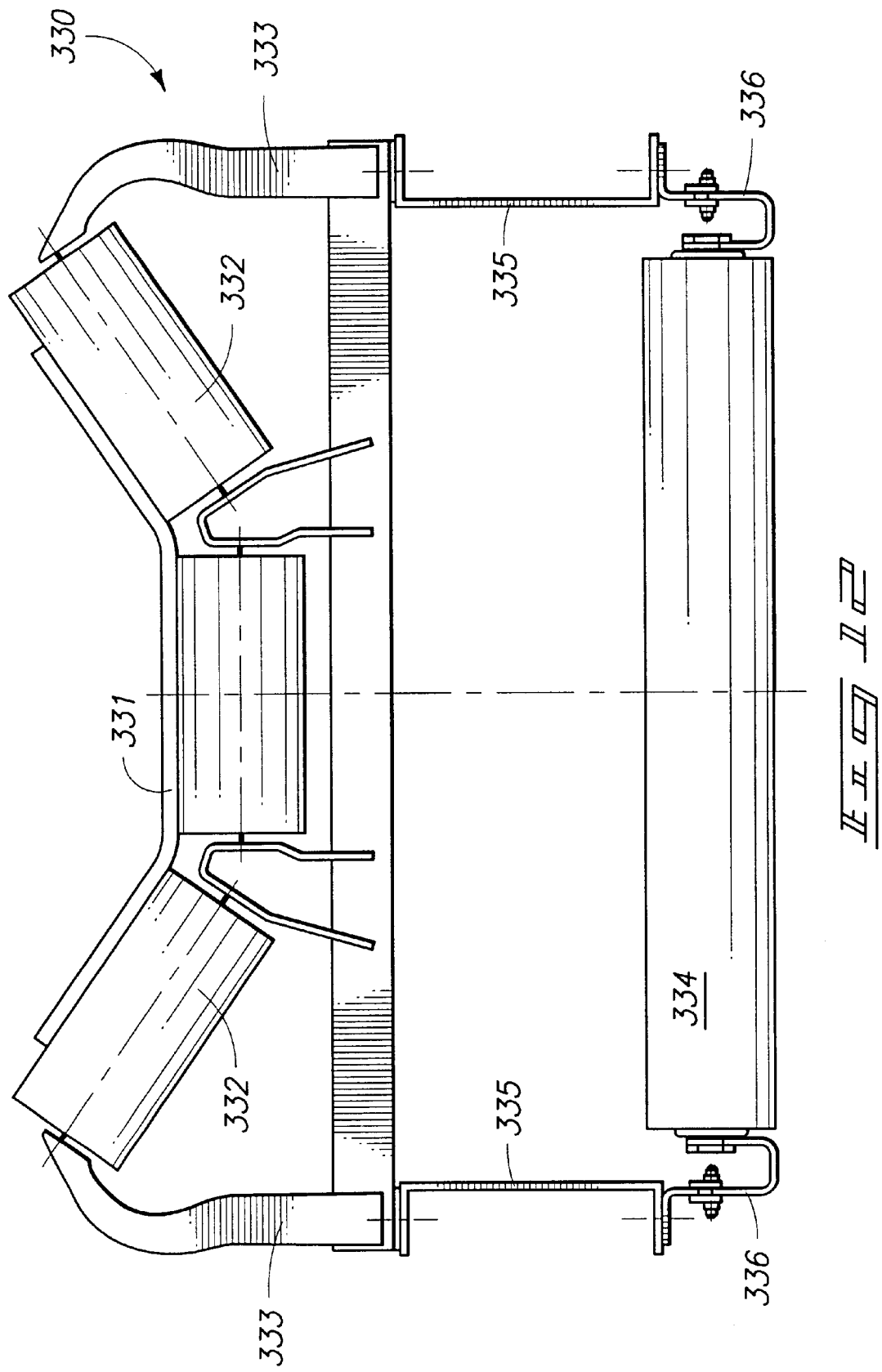

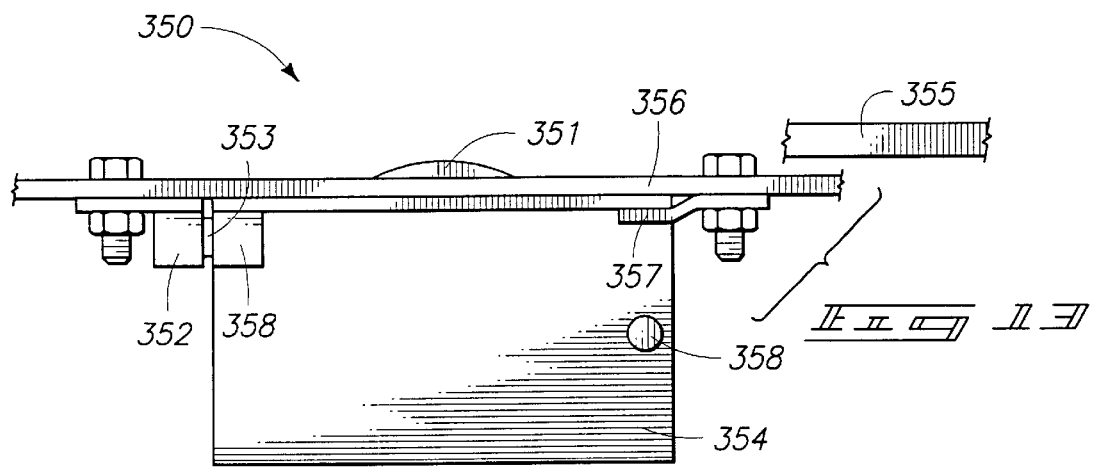
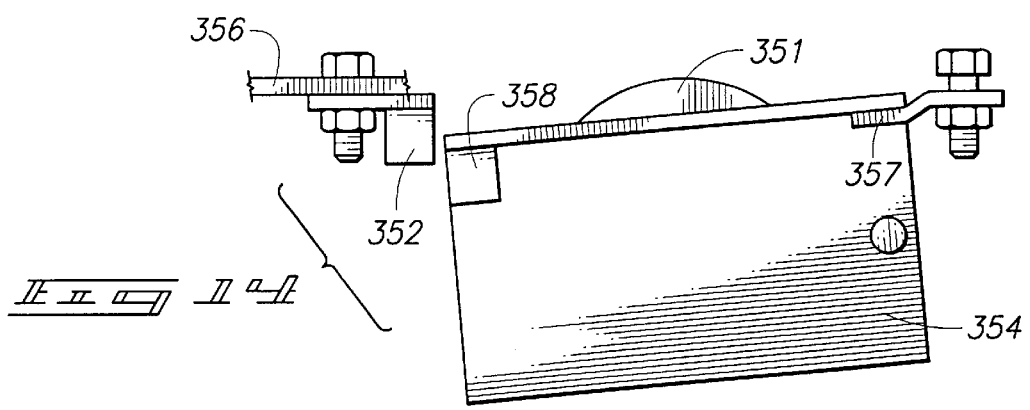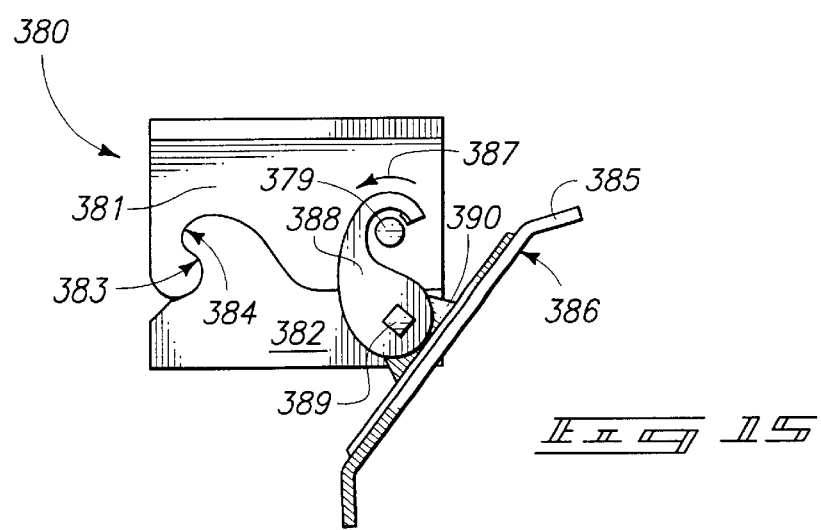

IDLER SYSTEM FOR CONVEYOR

CROSS REFERENCE TO RELATED APPLICATION

This application claims priority from U.S. provisional application Serial No. 60/285,628 which was filed on Apr. 23, 2001, titled GUARD ACTUATED QUICK RELEASE IDLER FRAME ASSEMBLY FOR CONVEYORS, naming Robert A. Horne as inventor, and which is incorporated by reference herein.

TECHNICAL FIELD

This invention relates to an idler system for conveyors in which the idler is released from or propelled away from the conveyor when a predetermined condition occurs. A predetermined condition may be a predetermined amount of pressure on the idler from something or someone becoming jammed between the idler and the conveyor belt, or a guard or trigger being activated for example.

BACKGROUND OF THE INVENTION

Conveyors have been used for many years, and it has been recognized there is a potential for human hands and other objects to become lodged between an idler and the conveyor belt which is in contact with the idler. In prior art attempts to reduce the propensity for an accident or for a jam condition, idler guards have been placed near the idler and the conveyor belt to prevent or obstruct a hand or other object from getting pinched between the idler and conveyor belt.

In prior art which utilizes a guard, there is still a pinch point between the idler and the conveyor belt and potentially a pinch point between the guard and the conveyor belt. Furthermore, persons and objects can still jam between the guard and the idler and then become lodged between the idler and the conveyor belt.

It is therefore an object of this invention to provide an improved idler system for conveyors which, upon a predetermined condition occurring, provides distance between the idler and the conveyor belt.

BRIEF DESCRIPTION OF THE DRAWINGS

Preferred embodiments of the invention are described below with reference to the following accompanying drawings.

FIG. 3 is an elevation view of another embodiment of this invention wherein the idler is typically held in place by a support bracket and the idler is released downward when a predetermined pinch condition occurs, or when the trigger or guard mechanism is tripped;

FIG. 4 is an elevation view of the embodiment of the invention illustrated in FIG. 3 after a predetermined condition has occurred and the bracket and the idler have been released;

FIG. 5 is view 5—5 from FIG. 3 and illustrates a longitudinal elevation view of the embodiment of the invention illustrated in FIG. 3;

FIG. 6 is an elevation view of another embodiment of this invention wherein the bracket retaining the idler in its normal position has been released and pivots downward to create a distance between the idler surface and the bottom surface of the conveyor;

FIG. 7 is a schematic depiction showing an increase in the pinch distance between the idler surface and the bottom surface of the conveyor belt;

FIG. 8 is an elevation view of another embodiment of the invention wherein the idler is mounted to the conveyor framework and released upon a predetermined condition occurring;

FIG. 9 is an elevation view of an idler support mechanism utilizing a bracket, once the mechanism has released the idler;

FIG. 12 is an elevation view of another embodiment of this invention, showing the return idler and a support or trough idler arrangement for the conveyor belt;

FIG. 13 is a side elevation view of another embodiment of the invention in which an electric solenoid interconnects the idler bracket with the framework and releases it when a predetermined condition exists;

FIG. 14 is a side elevation view of the embodiment of the invention illustrated in FIG. 13, after the electric solenoid has disengaged the idler bracket;

FIG. 15 is another embodiment of the invention in which the idler is released upon triggering a guard or trigger mechanism;

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

There are numerous embodiments of this invention, some which preferably apply or are to be used in connection with return idlers and others which are preferably used with support or trough idlers on a conveyor system, and some both. This invention is not limited to any one particular application of an idler system for a conveyor, but as will be seen and appreciated by those of ordinary skill in the art, it has application in several different applications.

Applicant hereby incorporates by reference the priority document, a provisional application, Serial No. 60/285,628 filed Apr. 23, 2001, by inventor Robert A. Horne, which is attached hereto as Appendix A, and which is incorporated herein by this reference.

Figure 1:
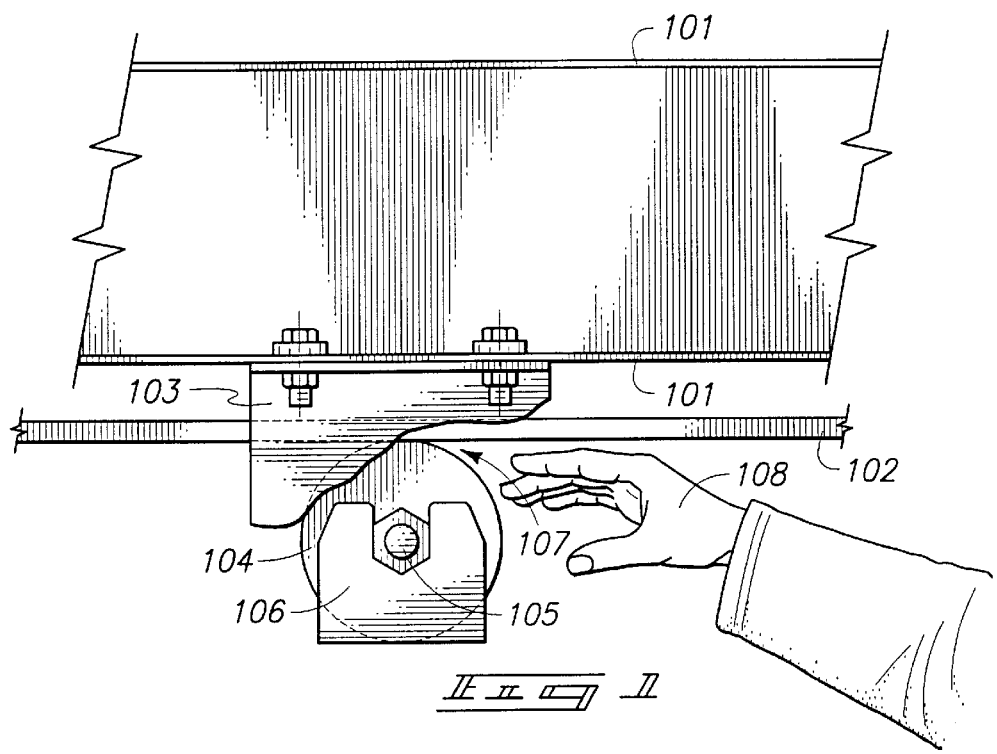
FIG. 1 is an elevation view of a conveyor assembly with an idler applied on the return conveyor belt.

FIG. 1 is a side elevation view of a conveyor assembly with idler 104 (a return idler) rotatably mounted about idler axis 105 on idler mount bracket 106. Idler bracket 103 is mounted to conveyor framework 101, and conveyor belt 102 is against idler 104. An object such as a person's hand 108 may become trapped between conveyor belt 102 and idler 104 as idler rotates in the direction of arrow 107.

Figure 2:
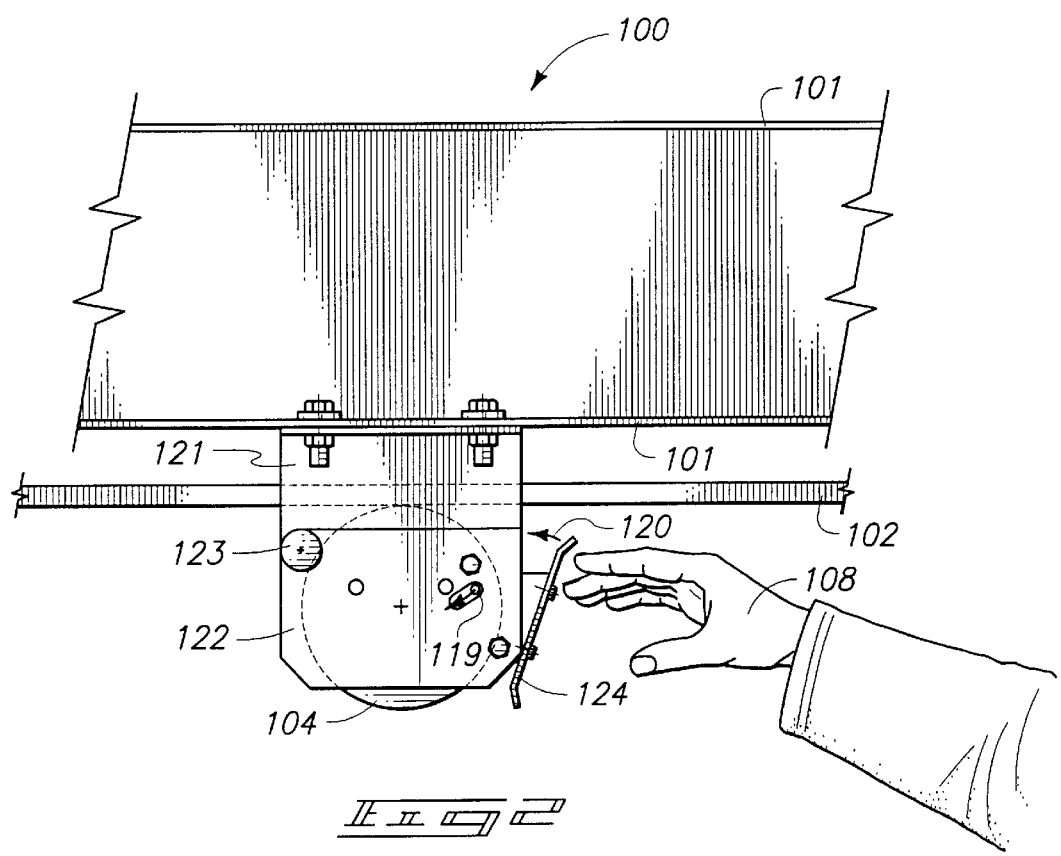
FIG. 2 is an elevation view of one embodiment of this invention wherein a releasable bracket retains the return idler against the bottom surface of the conveyor belt and is released when the trigger mechanism is engaged.

FIG. 2 illustrates a system 100 which comprises an embodiment of this invention and shows conveyor framework 101, conveyor belt 102, idler bracket 121 mounted to conveyor framework 101, second or removable idler bracket portion 122 removably attached to first portion or idler bracket framework 121 such that when guard or trigger 124 may be engaged in the direction of arrow 120 by hand 108, the removable idler bracket portion 122 will be released and the idler 104 along with removable idler bracket portion 122 will drop downward and create additional space between the top of idler 104 and the bottom surface of conveyor belt 102.

The movement of trigger 124 in the direction of arrow 120 mechanically causes pin 119 to move in the direction of the arrow shown, with pin 119 being attached to the linkage more fully shown in other figures, such as FIG. 4 for example. The release of one or both of the areas of support between the first bracket section and the second bracket section, allows the idler 104 to fall away from the conveyor belt 102.

It will be noted that support 123 is attached to idler bracket 121 and is a second point or area of support holding removable idler bracket portion 122 to idler bracket 121. The other point or area of support for holding removable idler bracket portion 122 to idler bracket 121 is shown in FIG. 4 as an example. When one or both of the areas of support are removed, the removable idler bracket section 122 may drop downward. In one embodiment of the invention, a bias force such as a spring may be placed between the first idler bracket section and the second idler bracket section, to assist in the separation of the two and the speed at which the idler 104 is moved away from the conveyor belt 102.

FIG. 3 is a side elevation view of another embodiment of the invention and illustrates another of the many mechanisms which may be utilized to practice this invention. FIG. 3 illustrates idler conveyor system 100, conveyor framework 101, idler bracket 103, conveyor belt 102, idler 104, removable idler bracket portion 131 and trigger 124 or guard. The trigger and link mechanism which is activated by trigger 124 is more clearly shown in FIG. 4 on the specific release mechanism, means and ways. FIG. 3 illustrates the idler system for conveyor when the idler is held in its normal operating position and in which the idler 104 is abutting the bottom surface of conveyor belt 102.

FIG. 4 is a side elevation view of the embodiment of the invention illustrated in FIG. 3, only showing the idler and removable idler bracket portion 131 after it has been released from idler bracket 103 and has fallen in the direction of arrow 136. FIG. 4 illustrates the idler system 100, conveyor framework 101, idler bracket 103, conveyor belt 102 and removable idler bracket portion 131. Trigger 124 is attached to first link 141 by bolt 140 such that first link 141 rotates with trigger 124 when the trigger or guard is activated. Second link 142 is attached to first link 141 via bolt 143 and when the trigger 124 is activated and first link 141 rotates downward, the second link 142 moves downward at a first end.

When the trigger is activated and 124 is moved, engagement surface 144 of first link 141 disengages from engagement surface 146 of idler bracket 103, thereby removing a point or area of support or engagement for the removable idler bracket portion 131 and also causing it to be preferably pushed downward. The movement of trigger 124 also causes the downward movement of second link 142 on its first side, which thereby causes engagement surface 145 of second link 142 to disengage from the engagement surface 147 of idler bracket 103. This again removes a point or area of support of removable idler bracket portion 131 and also may preferably serve to push the removable idler bracket portion 131 downward and away from idler bracket 103. Arrow 135 shows the direction which trigger 124 was pushed or moved to cause the disengagement as shown.

FIG. 5 is view 5—5 from FIG. 3 and illustrates a front elevation view of the embodiment of the invention shown in FIG. 3. FIG. 5 shows conveyor framework 101, idler bracket 103, conveyor belt 102, idler 104, return idler, and idler guard or trigger 124.

FIG. 6 is a side elevation view of another embodiment of an idler system 180 contemplated by this invention, in which a moveable idler support bracket 183 is utilized such that the idler 185 does not completely disengage but instead pivots downward to create additional space between the idler 185 and the conveyor belt which it is normally abutted against. FIG. 6 illustrates idler bracket 182 which may be bolted or otherwise attached to a conveyor framework, engagement/support pin 184, idler moveable bracket portion 183, guard or trigger 186, idler 185. The second point or area of support for moveable idler bracket portion 183 is engagement area 182a, which supports engagement surface 311 of link 312 (shown in FIG. 11 for example). The movement or triggering of the guard or trigger 186 causes disengagement from the idler bracket support area 182a.

In situations in which there may be a danger from the idler 186 falling downwardly, or when it is not desirable to allow it to fall, the arrangement shown in FIG. 6 provides for the support of the idler 185 by engagement pin 184 so that it will not fall to the ground or to whatever is below the idler. Other cables, ropes, straps or restraining devices may be used.

FIG. 7 is a schematic illustration of the creation of idler spacing between the bottom surface of the conveyor belt 201 and the top of the outer idler surface 204b. Distance 205 is the distance created by the triggering of the idler system and creates a predetermined distance to minimize or eliminate the safety hazard or other predetermined condition for which the idler system is in place, and may also be referred to as a pinch distance. The distance 205 will depend on the application and the embodiment of the invention the distance 205 for a particular application. In some situations the distance may be a very small distance and be less than an inch, and in other embodiments or applications the distance may be several feet as the idler will be falling downward. The idler system 200 shown in FIG. 7 also illustrates a second idler 202 which rotates about axis 203, but which has not been activated by a predetermined condition.

FIG. 8 is a side elevation schematic view of an embodiment of this invention and illustrates the dropping of idler 224 from its normal operating position to a lower position, which creates a safety or pinch distance 227 between the top of the outer surface 224b and the bottom surface of conveyor belt 222. Conveyor framework 221 includes idler mount 223 (considered in this embodiment, part of the conveyor framework) and FIG. 8 also shows idler axis 225. In this embodiment, a separate bracket is not required, but instead the idler is removably mounted to the framework via framework piece or section 223, which is an idler mount. No additional bracket or mounting is required, and item 223 may be considered part of the framework.

Figure 16:
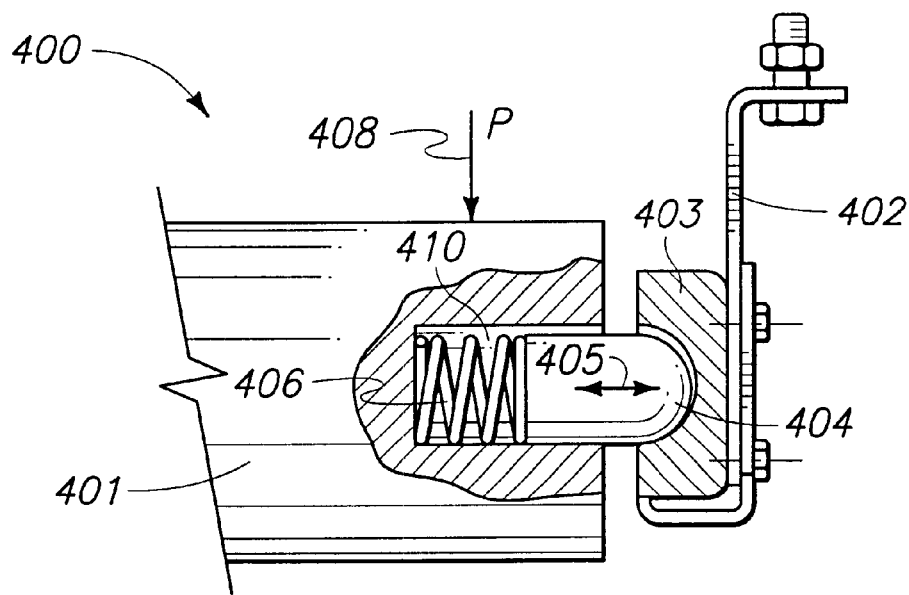
FIG. 16 is yet another embodiment of the invention in which no bracket is required and a predetermined pressure on the idler causes the idler to release from the framework.
Figure 17:
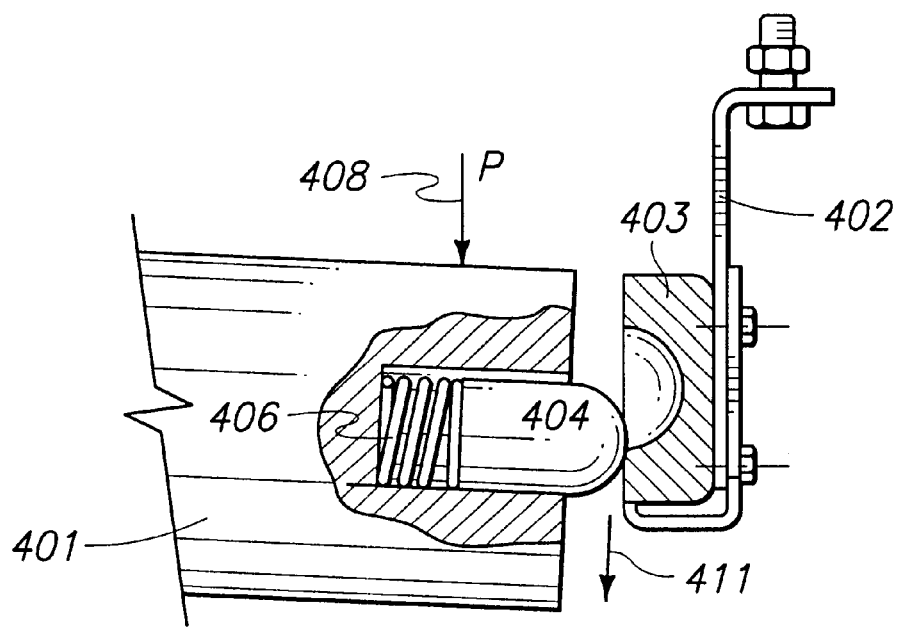
FIG. 17 illustrates the embodiment of the invention shown in FIG. 16 after a predetermined pressure on the idler has caused the idler to move away from the conveyor belt.

An embodiment of the invention which causes the release of the idler 224 as shown in FIG. 8 may be that shown in FIGS. 16 and 17, although others may be possible. Creating the distance between the top of outer idler surface 224b and the bottom surface of conveyor belt 222 is a material part or functino, whether the idler is removably mounted directly to the conveyor framework 221 or whether the idler is mounted to an idler support bracket which is released and causes the downward movement of the idler 224 and the creation of safety distance 227 or pinch distance 227.

FIG. 9 is a side elevation view of an embodiment of an idler system 250 contemplated by this invention wherein the idler 253 is mounted on removable idler bracket portion 252 which is mounted to idler bracket 251 at engagement pin 257 and engagement surface 258 of idler bracket 251. The movement of trigger/guard 255 causes the movement of linkage as reflected by engagement pin 254, and the linkage then disengages from engagement surface 258 of idler bracket 251, thereby releasing the first engagement point or area of removable idler bracket portion 252. The removal of the first engagement point then causes the removable idler bracket portion 252 to rotate downward at the trigger side and the rotation then causes engagement surface 256 to become disengaged from engagement pin 257 and the idler falls downwardly.

It will be appreciated by those of ordinary skill in the art that this embodiment further contemplates the insertion or addition of bias and/or spring mechanisms between the two respective bracket portions to accelerate the movement of idler 253 away from the conveyor, i.e. to increase the pinch distance.

Figure 10:
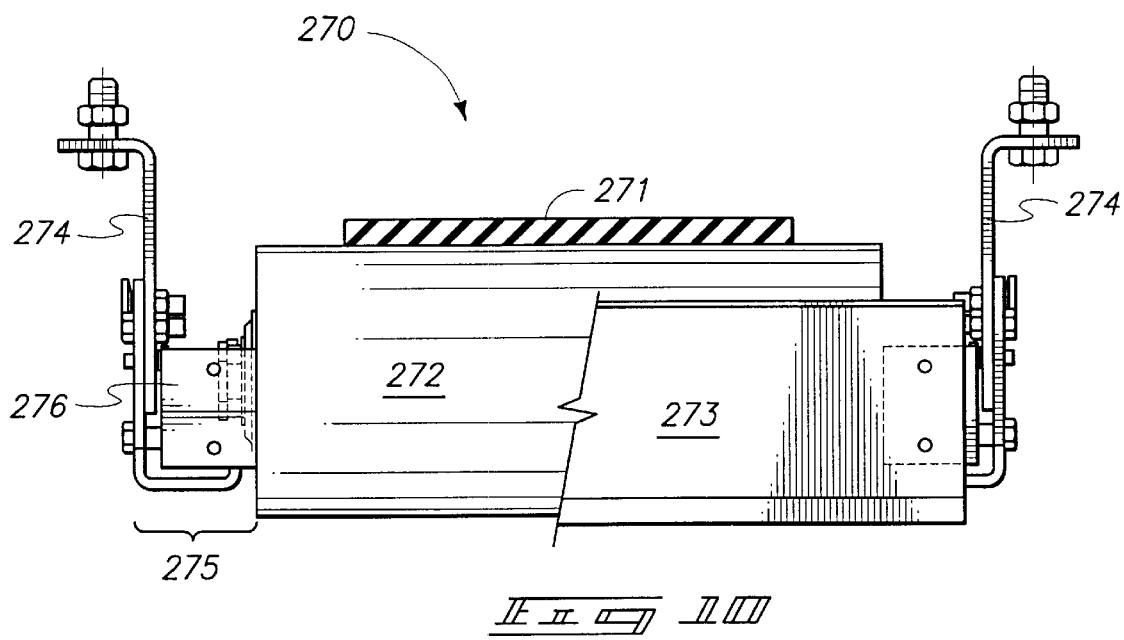
FIG. 10 is a front elevation view of the embodiment of the invention illustrated in FIG. 2.

FIG. 10 is a front elevation view of an embodiment of this invention of an idler system 270 contemplated by this invention, showing conveyor belt 271, idler 272, trigger 273, idler bracket 274 and guard mount bracket 276. Please note that the idler 272 need not be mounted symmetrically within the conveyor framework but instead may be offset to allow for the mechanisms of the idler system to be located therebetween.

Figure 11:
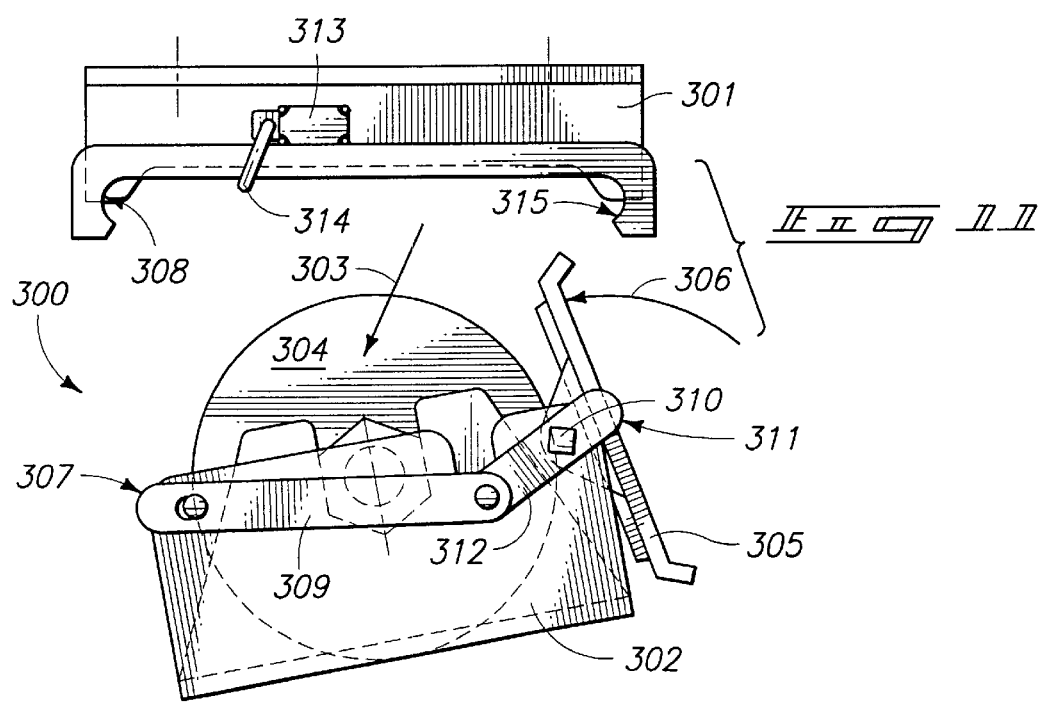
FIG. 11 is a side elevation view of another embodiment of the invention in which the idler is released and limit switch attached to the framework shuts down the conveyor upon a predetermined condition occurring.

FIG. 11 is a side elevation view of another embodiment of this invention showing an idler system 300 in which a limit switch 313 is included in the idler system 300 and which is operatively connected to the conveyor such that when idler 304 drops away, the limit switch is activated and the conveyor is shut down.

FIG. 11 illustrates limit switch 313 attached to idler bracket 301 via attachment fastener 314, a strap in this case. Limit switches and their connection to the operation of the conveyor are known in the art and will not therefore be described in greater detail here.

FIG. 11 illustrates the movement of guard 305 in the direction of arrow 306 which via square bolt 310 rotates first link 312 such that the engagement surface 311 of first link 312 disengages from the first engagement surface 315 of idler bracket 301. Second link 309 is pivotally connected to first link 312 as shown, and the engagement surface 307 of second link 309 disengages from engagement surface 308 from second engagement surface 308 of idler bracket 301 when guard 305 is moved in the direction of arrow 306. The movement of the mechanism as shown removes the engagement or support surface such that removable idler bracket portion 302 is no longer supported and drops downwardly to create an increased distance between a bottom surface of a conveyor belt and a top of the outer surface of idler 304.

FIG. 12 is a front elevation view of a section of an exemplary conveyor system 330, illustrating return idler 334, trough idlers 332 or support idlers, conveyor belt 331, conveyor framework sections 333 and 335, and idler mount bracket 336. It will be appreciated by those of ordinary skill in the art that each of the idlers shown herein, whether they are a support idler or return idler, may be provided with the idler system disclosed by this invention. Each of the support idlers 332 are rotatably mounted to the conveyor framework and the nature and type of a conveyor for which this idler system may be used is not limited to this or any others shown herein but may be applied to any conveyor systems.

FIG. 13 is a side elevation view of another embodiment of this invention, showing an idler system 350 with idler 351 being mounted to conveyor framework 356 via idler bracket 354. Idler bracket 354 is supported and operatively attached to conveyor framework 356 as shown, wherein support 357 provides a first point of engagement or support between idler bracket 354 and conveyor framework 356. The second point of engagement or support is the solenoid shown, which has a first solenoid portion 352 which is attached to conveyor framework 356 and a second solenoid portion 358 which is attached to idler bracket 354. The interconnection 353 of the solenoid configuration shown provides the points of support or engagement when the idler 351 is in its normal operating position. When a predetermined condition arises which is desirable to resolve by the movement of the idler 351 away from a bottom surface of conveyor belt 355, then solenoid will operate and the item 353 retracts into either first solenoid portion 352 or second solenoid portion 358 to remove the points of support or engagement between the two and the second point of engagement is removed. Once this point of support or engagement is removed, bracket 354 falls downwardly on the solenoid side, thereby rotating the bracket and causing the first point of engagement to likewise allow the idler 351 to fall downwardly and become disengaged, as shown more fully in FIG. 14.

FIG. 14 illustrates conveyor framework 356, first solenoid portion 352, second solenoid portion 358, idler 351, point or area of engagement 357 and idler bracket 354. The solenoid may be electric. The movement shown in FIG. 14 will create distance between a top of the outer surface of idler 351 and a lower surface of conveyor belt 355 (shown in FIG. 13). This illustrates another means, an electromechanical means, to provide another embodiment of an idler system contemplated by the invention disclosed herein.

It will be appreciated by those of ordinary skill in the art that the disengagement mechanism or trigger may by any one of a number of different types which are know in the art, such as a electric eye 358 (electronically connected to the solenoid), or a motion detector direct to the pinch area, such that the detection of an object in an area such as the pinch area, would trigger or initiate the disengagement of the idler.

FIG. 15 is a side elevation view of yet another embodiment of a mechanism which may be utilized to increase the distance between an idler and the bottom surface of a conveyor belt. FIG. 15 illustrates an idler system 380 with fixed idler bracket 381, removable idler bracket 382, guard 385 or trigger, arrow 386 representing the direction of movement of trigger, square bolt 389 providing a connecting point between guard 385 and engagement member 388, and point or area of engagement 384 of removable idler bracket 382 and area of engagement 383 for fixed idler bracket 381. Engagement element 388 moves in the direction of arrow 387 and thereby disengages with engagement pin 379 to remove a first point of engagement between removable idler bracket 382 and fixed idler bracket 381. Once this first point of engagement is removed, the removable idler bracket portion 382 rotates downwardly in a clockwise direction as shown in FIG. 15, and area of engagement 384 disengages from area of engagement 383 of fixed idler bracket portion 381. The idler (not shown) in FIG. 15 would be mounted to removable idler bracket portion 382 and drop when guard 385 is rotated in the direction of arrow 386.

FIG. 16 is a front elevation and cutaway view of yet another embodiment contemplated by this invention, showing an embodiment in which pressure applied to the idler causes the idler to become disengaged from the conveyor framework. The idler system 400 illustrated in FIG. 16 shows pressure applied in the direction of arrow 408 to idler 401. Idler 401 is shown mounted to idler mount 403 on conveyor framework 402 via mount peg 404. Mount peg 404 is bias mounted within peg aperture 410 in idler 401, and the pressure imposed by spring 406 on mount peg 404 holds mount peg within an aperture or indent in idler mount 403, thereby holding the idler 401 in its normal position during operation. Once the pressure indicated by arrow 408 reaches a predetermined level, the downward force will cause the force of spring 406 to be overcome by the inward force indicated by arrow 405 on mount peg 404 and thereby move idler 401 downward in the direction of arrow 411. The movement of a first side of idler 401 downward will thereby cause the idler to be disengaged from the idler mount 403 and conveyor framework 402 and thereby increase the distance between a bottom surface of a conveyor belt and a top of idler outer surface 401. This increase in distance will increase the safety and the idler 401 may be allowed to drop to the ground or a lower level, or it may by suspended by cable or other suspending device to prevent it from dropping downwardly when that is a design or safety concern.

FIG. 17 illustrates the embodiment of the invention shown in FIG. 16 after a predetermined pressure on the idler has caused the idler to move away from the conveyor belt. FIG. 17 the idler system 400 illustrated in FIG. 16 and shows pressure or force applied in the direction of arrow 408 to idler 401. Idler 401 is shown forced or moved away from idler mount 403 on conveyor framework 402 via mount peg 404. Mount peg 404 is bias mounted within peg aperture 410 in idler 401, and the pressure imposed by spring 406 on mount peg 404 holds mount peg within an aperture or indent in idler mount 403, thereby holding the idler 401 in its normal position during operation. Once the pressure indicated by arrow 408 reaches a predetermined level, the downward force will cause the force of spring 406 to be overcome by the inward force indicated by arrow 405 on mount peg 404 and thereby move idler 401 downward in the direction of arrow 411, as shown in FIG. 17. The movement of a first side of idler 401 downward will thereby cause the idler to be disengaged from the idler mount 403 and conveyor framework 402 and thereby increase the distance between a bottom surface of a conveyor belt and a top of idler outer surface 401. This increase in distance will increase the safety and the idler 401 may be allowed to drop to the ground or a lower level, or it may by suspended by cable or other suspending device to prevent it from dropping downwardly when that is a design or safety concern.

As will be appreciated by those of reasonable skill in the art, there are numerous embodiments to this invention, and variations of elements and components which may be used, all within the scope of this invention.

One embodiment of this invention, for example, is a conveyor apparatus comprising: a conveyor framework; an idler rotatably and releasably mounted to the conveyor framework via a quick release means which dismounts the idler in response to a pre-determined condition. Further embodiments of the foregoing may be: further wherein the idler is rotatably mounted directly to the conveyor framework; further wherein the idler is rotatably mounted to the conveyor framework at two engagement areas; wherein the predetermined condition is a force of a pre-determined magnitude applied to the idler; wherein the predetermined condition is a detection of an object near the idler; and/or wherein the predetermined condition is movement of an idler guard.

A still further embodiment of the above reference system may be one which further comprises an idler support means to which the idler is rotatably mounted, the idler support means being configured to releasably attach to the conveyor framework, and to detach in response to a predetermined condition; or further wherein the quick release means is an electric connecting solenoid with a first side attached to the conveyor framework, a second side integral with the idler and an interconnecting link removably attaching the first side and the second side of the connecting solenoid.

In another embodiment of the invention, a conveyor apparatus is provided, which comprises: a conveyor framework; an idler rotatably mounted to the conveyor framework and supported at two engagement areas by the conveyor framework; and a disengagement trigger mounted to the conveyor framework and operatively attached to at least one of the two engagement areas and disposed to disengage at least one of the two engagement areas when a pre-determined condition occurs. Further embodiments of the foregoing may be: further wherein the idler is rotatably mounted directly to the conveyor framework; further wherein the predetermined condition is a force of a pre-determined magnitude applied to the idler; wherein the predetermined condition is a detection of an object near the idler; and/or wherein the predetermined condition is movement of an idler guard.

A still further embodiment of the above reference system may be one which further: wherein the disengagement trigger is an idler guard operatively attached to at least one of the two engagement areas and disposed to disengage at least one of the two engagement areas when moved; and/or wherein the disengagement trigger is an electric connecting solenoid with a first side attached to the conveyor framework, a second side integral with the idler and an interconnecting link removably attaching the first side and the second side of the connecting solenoid.

In another embodiment of the invention, an idler system for conveyors is provided, which comprises: a idler bracket with a first bracket section and a second bracket section, the first bracket section configured to attach to a conveyor framework; an idler rotatably mounted to the second bracket section; and wherein the second bracket section is supported by the first bracket section at a first support area and a second support area, and wherein at least one of the first support area and the second support area are disengageable to allow the second bracket section to move away from the first.

In a further embodiment from the one recited in the preceding paragraph, such a system may further: comprise a spring between the first bracket section and the second bracket section, the spring configured to force the second bracket section away from the first bracket section when at least one of the first support area and the second support area are disengaged; and/or further comprise a disengagement trigger operatively attached to at least one of the two support areas and disposed to disengage at least one of the two support areas.

In another embodiment of the invention, an idler system for mounting to a conveyor framework is provided, the idler system comprising: an idler body with an outer surface and rotatably mounted on an idler axis, wherein the idler axis is configured for mounting to a conveyor framework; an idler disengagement system which disengages the idler from the conveyor framework upon a predetermined condition occurring. A further embodiment of the preceding embodiment may be further wherein the idler disengagement system includes a bias idler axis member against a corresponding fixed idler support on the conveyor framework; and/or further wherein the predetermined condition is movement of a disengagement trigger; and/or further wherein the predetermined condition is a sensing of an object near the idler.

Another embodiment of the invention, a method embodimnet, may be a method for providing a conveyor idler disengagement system, comprising the following: providing an idler configured to rotate about its longitudinal axis; mounting the idler to a conveyor framework to interact with a conveyor belt, the idler being mounted at a first support section and a second support section, the second support section being configured to disengage upon the occurrence of a pre-determined condition; disengaging the second support section upon the occurrence of the pre-determined condition; and thereby causing the idler to move away from the conveyor belt. A further embodiment of this may be wherein the system further comprises providing an idler guard operative connected to the second support section such that the movement of the idler guard disengages the second support section.

In another method embodiment of the invention, a method for providing a conveyor idler disengagement system is provided, comprising the following: providing an idler bracket with a first bracket section and a second bracket section, the second bracket having an idler rotatably mounted thereto; attaching the first bracket section to a conveyor framework; detachably mounting the second bracket section to the first bracket section at wherein the second bracket section is supported by the first bracket section at a first support area and a second support area, and wherein at least one of the first support area and the second support area are disengageable to remove an area of support of the second bracket; and providing a disengagement trigger disposed to remove an area of support of the second bracket, which allows the idler to move away from the first support bracket portion. A further embodiment of this may be further wherein the disengagement trigger is an idler guard movably mounted to also act as a disengagement trigger.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proer scope of the appended claims appropriately interpreted in accordance with the doctrine of equivalents.

I claim:

1. A belt conveyor apparatus comprising:
   a belt conveyor framework;
   an idler rotatably and releasably mounted to the belt conveyor framework via a quick release mechanism which dismounts the idler in response to a predetermined operational condition.

2. A belt conveyor apparatus as recited in claim 1, and further wherein the idler is rotatably mounted directly to the belt conveyor framework.

3. A belt conveyor apparatus as recited in claim 1, and further wherein the idler is rotatably mounted to the belt conveyor framework at two engagement areas.

4. A belt conveyor apparatus as recited in claim 1, and wherein the predetermined operational condition is detection of a force of a pre-determined magnitude applied to the idler by a disengagement trigger.

5. A belt conveyor apparatus as recited in claim 1, and wherein the predetermined operational condition is a detection of an object near the idler by a disengagement trigger.

6. A belt conveyor apparatus as recited in claim 1, and wherein the predetermined operational condition is a physical movement of an idler guard by an object near the idler.

7. A belt conveyor apparatus as recited in claim 1, and further comprising an idler support means to which the idler is rotatably mounted, the idler support means being configured to releasably attach to the belt conveyor framework, and to detach in response to a predetermined operational condition.

8. A belt conveyor apparatus as recited in claim 1, and further wherein the quick release mechanism is an electric connecting solenoid with a first side attached to the belt conveyor framework, a second side integral with the idler and an interconnecting link removably attaching the first side and the second side of the connecting solenoid, the electric connecting solenoid being operationally connected to a disengagement trigger.

9. A belt conveyor apparatus comprising:
   a belt conveyor framework;
   an idler rotatably mounted to the belt conveyor framework and supported at two engagement areas by the belt conveyor framework;
   a disengagement trigger mounted to the belt conveyor framework and operatively attached to at least one of the two engagement areas and disposed to automatically disengage at least one of the two engagement areas when a predetermined operational occurs.

10. A belt conveyor apparatus as recited in claim 9, and further wherein the idler is rotatably mounted directly to the belt conveyor framework.

11. A belt conveyor apparatus as recited in claim 9, and wherein the predetermined operational condition is a detection of a force of a pre-determined magnitude applied to the idler by a disengagement trigger.

12. A belt conveyor apparatus as recited in claim 9, and wherein the predetermined operational condition is a detection of an object near the idler by a disengagement trigger.

13. A belt conveyor apparatus as recited in claim 9, and wherein the predetermined operational condition is a physical movement of an idler guard by an object near the idler.

14. A belt conveyor apparatus as recited in claim 9, and further wherein the disengagement trigger is an idler guard operatively attached to at least one of the two engagement areas and disposed to automatically disengage at least one of the two engagement areas when moved.

15. A belt conveyor apparatus as recited in claim 9, and further wherein the idler is supported by at least one electric connecting solenoid with a first side attached to the belt conveyor framework, and a second side integral with the idler and an interconnecting link removably attaching the first side and the second side of the connecting solenoid.

16. An idler system for belt conveyors, comprising:
   a idler bracket with a first bracket section and a second bracket section, the first bracket section configured to attach to a belt conveyor framework;
   an idler rotatably mounted to the second bracket section; and
   wherein the second bracket section is supported by the first bracket section at a first support area and a second support area, and wherein at least one of the first support area and the second support area are automatically disengageable to allow the second bracket section to move away from the first.

17. An idler system for belt conveyors as recited in claim 16, and further comprising a spring between the first bracket section and the second bracket section, the spring configured to force the second bracket section away from the first bracket section when at least one of the first support area and the second support area are automatically disengaged.

18. An idler system for belt conveyors as recited in claim 16, and further comprising a disengagement trigger operatively attached to at least one of the two support areas and disposed to automatically disengage at least one of the two support areas.

19. An idler system for mounting to a belt conveyor framework, the idler system comprising:
   an idler body with an outer surface and rotatably mounted on an idler axis, wherein the idler axis is configured for mounting to a belt conveyor framework;
   an idler disengagement system which automatically disengages the idler from the belt conveyor framework upon a predetermined operational condition occurring.

20. An idler system as recited in claim 19, and further wherein the idler disengagement system includes a bias idler axis member against a corresponding fixed idler support on the belt conveyor framework.

21. An idler system as recited in claim 19, and further wherein the predetermined operational condition is physical movement of a disengagement trigger.

22. An idler system as recited in claim 19, and further wherein the predetermined operational condition is a sensing of an object near the idler by a disengagement trigger.

23. A method for providing a belt conveyor idler disengagement system, comprising the following:
   providing an idler configured to rotate about its longitudinal axis;
   mounting the idler to a belt conveyor framework to interact with a conveyor belt, the idler being mounted at a first support section and a second support section, the second support section being configured to automatically disengage upon the occurrence of a predetermined operational condition;
   disengaging the second support section upon the occurrence of the predetermined operational; and
   thereby causing the idler to move away from the belt conveyor framework.

24. A method for providing a belt conveyor idler disengagement system as recited in claim 23, and further comprising providing an idler guard operative connected to the second support section such that the movement of the idler guard automatically disengages the second support section.

25. A method for providing a belt conveyor idler disengagement system, comprising the following:
   providing an idler bracket with a first bracket section and a second bracket section, the second bracket having an idler rotatably mounted thereto;
   attaching the first bracket section to a belt conveyor framework;
   detachably mounting the second bracket section to the first bracket section at wherein the second bracket section is supported by the first bracket section at a first support area and a second support area, and wherein at least one of the first support area and the second support area are automatically disengageable to remove an area of support of the second bracket; and
   providing a disengagement trigger disposed to remove an area of support of the second bracket, which allows the idler to move away from the first support bracket portion.

26. A method for providing a belt conveyor idler disengagement system as recited in claim 25, and further wherein the disengagement trigger is an idler guard movably mounted to also act as a disengagement trigger.

* * * * *